(12) United States Patent
Douglas-Middleton et al.

(10) Patent No.: US 11,546,326 B2
(45) Date of Patent: *Jan. 3, 2023

(54) CARD-PERSONALIZATION SYSTEM

(71) Applicant: Truist Bank, Charlotte, NC (US)

(72) Inventors: Elliotte Douglas-Middleton, Raleigh, NC (US); Nicole Riggs Mathes, Raleigh, NC (US); Madhusadan Panda, Cary, NC (US); Jennifer Kay Herring, Raleigh, NC (US); Charles C. Lyttle, Clayton, NC (US); Alok Kumar, Cary, NC (US)

(73) Assignee: Truist Bank, Charlotte, NC (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/315,564

(22) Filed: May 10, 2021

(65) Prior Publication Data

US 2021/0266313 A1    Aug. 26, 2021

Related U.S. Application Data

(63) Continuation of application No. 16/538,276, filed on Aug. 12, 2019, now Pat. No. 11,032,274, which is a
(Continued)

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 9/40 | (2022.01) |

(Continued)

(52) U.S. Cl.
CPC .......... *H04L 63/0853* (2013.01); *G06F 21/00* (2013.01); *G06Q 20/355* (2013.01); *G07F 7/08* (2013.01)

(58) Field of Classification Search
CPC ..... H04L 63/0853; G06F 21/00; G06F 21/34; G06F 2221/2115; G06Q 20/355; G07F 7/08
See application file for complete search history.

(56) References Cited

U.S. PATENT DOCUMENTS 7,249,096 B1   7/2007  Lasater et al.
8,856,867 B1   10/2014 Scalora
(Continued)

OTHER PUBLICATIONS

U.S. Appl. No. 16/538,276, Notice of Allowance, dated Feb. 8, 2021, 21 pages.

*Primary Examiner* — Amie C. Lin
(74) *Attorney, Agent, or Firm* — Kilpatrick Townsend & Stockton LLP; Michael A. Springs, Esq.

(57) ABSTRACT

A personalized card may be generated using a card-personalization system accessible via multiple access points on a network. In some aspects, the personalized card may include a physical card having an image selected by a user in a card-personalization process. The user may be assigned a code that may both authenticate the user to access the card-personalization system and identify a position of the user in the card-personalization process. The card-personalization process may include a selection process for selecting an image, an approval process for approving the image, and a creation process for generating the personalized card including the image.

20 Claims, 12 Drawing Sheets

Related U.S. Application Data continuation of application No. 15/088,483, filed on Apr. 1, 2016, now Pat. No. 10,425,406.

(60) Provisional application No. 62/141,559, filed on Apr. 1, 2015.

(51) Int. Cl.
  *G06F 21/00* (2013.01)
  *G06Q 20/34* (2012.01)
  *G07F 7/08* (2006.01)

(56) References Cited

U.S. PATENT DOCUMENTS

| | | | |
|---|---|---|---|
| 10,425,406 B2 | 9/2019 | Douglas-Middleton et al. | |
| 2004/0221239 A1* | 11/2004 | Hachigian | G09B 7/02 |
| | | | 715/708 |
| 2006/0153429 A1* | 7/2006 | Gehlen | G06V 40/161 |
| | | | 382/173 |
| 2011/0072988 A1* | 3/2011 | Elgar | G06F 3/04842 |
| | | | 101/4 |
| 2011/0155799 A1* | 6/2011 | Meszaros | G06Q 20/102 |
| | | | 235/379 |
| 2012/0331536 A1 | 12/2012 | Chabbewal et al. | |
| 2019/0364037 A1 | 11/2019 | Douglas-Middleton et al. | |

\* cited by examiner

FIG. 6

CARD-PERSONALIZATION SYSTEM

CROSS-REFERENCE TO RELATED APPLICATION

This is a continuation of U.S. Non-provisional application Ser. No. 16/538,276, filed Aug. 12, 2019, which is a continuation of U.S. Non-provisional application Ser. No. 15/088,483, filed Apr. 1, 2016, now U.S. Pat. No. 10,425,406, which claims priority to U.S. Provisional Application Ser. No. 62/141,559, filed Apr. 1, 2015 and titled "Card Design Application Authentication," the entirety of each of which is hereby incorporated by reference herein.

TECHNICAL FIELD

The present disclosure generally relates to card-personalization systems, and, more particularly, although not necessarily exclusively, to generating a personalized physical card using a physical card-personalization system having multiple access points on a network.

BACKGROUND

Online platforms may provide users access to numerous resources via the Internet and other networks. The network resources may include public resources that are generally accessible as well as personalized resources including sensitive information intended only for a particular customer. Authentication processes may be used to allow access to the personalized resources. For example, a user may be required to enter a password, or other personalized information corresponding to the user, to confirm the user's identity prior to allowing access to certain network resources having sensitive information. Each of the network resources may be interconnected to allow users to navigate between the various public and personalized resources from different points of access to each network resource. Certain personalized resources may be directed toward sensitive information or processes that require a user to navigate to the resource multiple times over an extended period. Difficulties may arise with respect to maintaining the authentication of the user without requiring a user to repeatedly reenter authentication information when navigating to the personalized resource from different access points.

SUMMARY

In some aspects of the present disclosure, a system may include a processing device configured for communicating through multiple access points of a network to exchange information with a user. The multiple access points may include a plurality of different devices and a plurality of different communication channels. The system may also include a memory device accessible to the processing device and including instructions executable by the processing device to cause the processing device to receive a code from a device of the plurality of different devices, the device being associated with the user. The memory device may also include instructions executable by the processing device to cause the processing device to access a location in memory and use the code and user information stored at the location in the memory to authenticate the user and determine a current step of the user in a process that includes a plurality of steps for personalizing a physical card. In some aspects, the plurality of steps may include at least receiving an image, or a selection of the image, from user input and associating the image with a personalization plan for the physical card. The memory device may also include instructions executable by the processing device to cause the processing device to transmit the image and the personalization plan for the physical card electronically to a printing subsystem for generating a personalized card for the user using the personalization plan for the physical card.

In additional aspects of the present disclosure, a method may include receiving a code from a user via a device of a plurality of user devices couplable to a card-personalization system that is accessible to the plurality user devices through multiple access points of a network. The method may also include authenticating the user from the device by accessing a location in a memory of the card-personalization system and comparing the code to a stored code that is associated with the user in the memory. The method may also include determining a current step of the user in a process that includes a plurality of steps for personalizing a physical card, the plurality of steps including at least receiving an image, or a selection of the image, from user input and associating the image with a personalization plan for the physical card. The method may also include transmitting the image and the personalization plan for the physical card electronically to a printing subsystem for generating a personalized card for the user using the personalization plan for the physical card.

In additional aspects of the present disclosure, a non-transitory computer-readable medium may include program code executable by a processing device configured for communicating through multiple access points of a network to exchange information with a user. The multiple access points may include a plurality of different devices and a plurality of different communication channels. The program code may be executable by the processing device to cause the processing device to generate a code in response to a request to personalize a physical card, the code including a random set of alphanumeric characters. The program code may also be executable by the processing device to cause the processing device to transmit the code to the user via the network in an electronic message, the electronic message including a link corresponding to an access point of the multiple access points. The program code may also be executable by the processing device to cause the processing device to receive the code from the user via a device of a plurality of user devices. The program code may also be executable by the processing device to cause the processing device to authenticate the user from the device by accessing a location in a memory and comparing the code to a stored code that is associated with the user in the memory. The program code may also be executable by the processing device to cause the processing device to determine a current step of the user in a process that includes a plurality of steps for personalizing the physical card. The plurality of steps including at least receiving an image, or a selection of the image, from user input and associating the image with a personalization plan for the physical card.

BRIEF DESCRIPTION OF THE DRAWINGS

FIG. 6 is an example of a user interface generated by the system of FIG. 1 for receiving a user code according to some aspects of the present disclosure.

DETAILED DESCRIPTION

Figure 1:
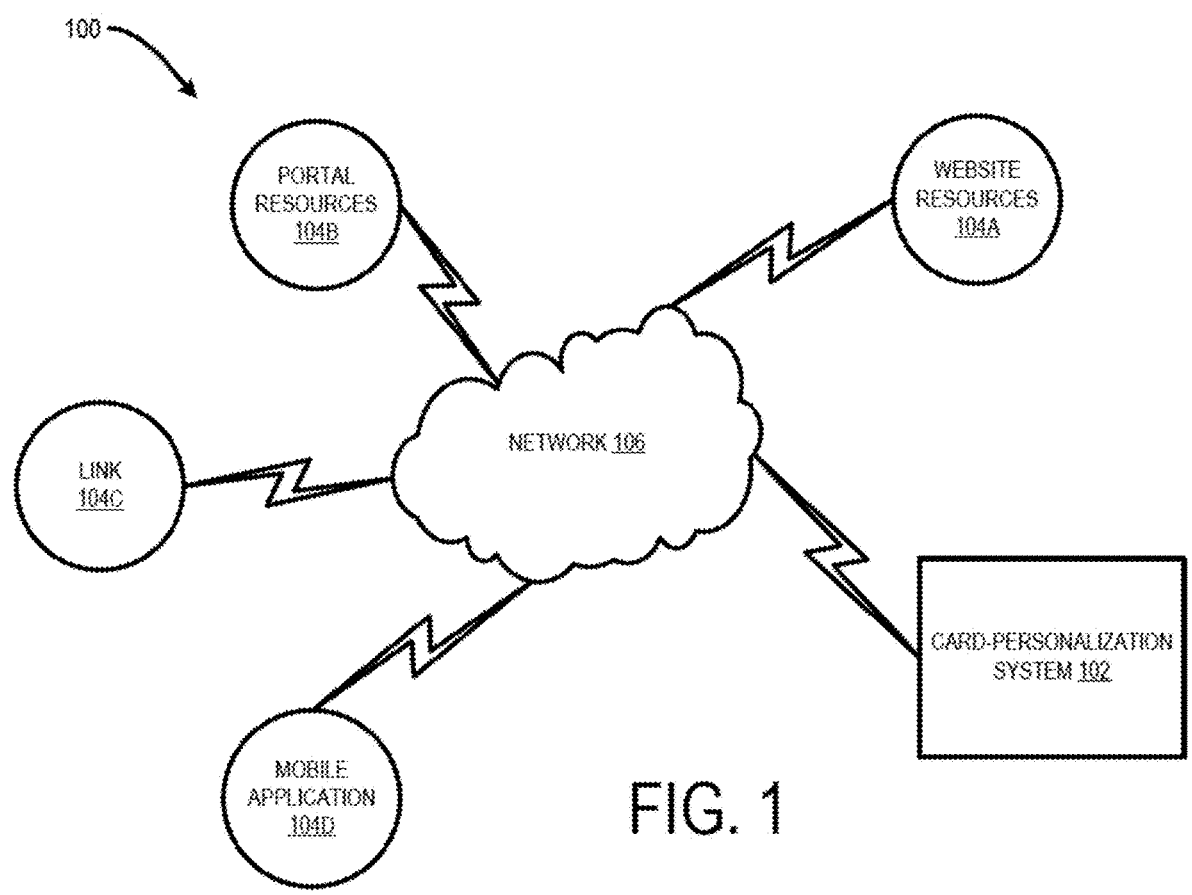
FIG. 1 is a block diagram depicting a network environment for accessing a card-personalization system from multiple network resources according to some aspects of the present disclosure.

Certain aspects and features of the present disclosure relate to a card-personalization system accessible by a user device from any of multiple network resources or channels using a unique user code that is associated with both authentication information for the card-personalization system and a status of the user in a card-personalization process. The card-personalization system may include a personalization engine configured to allow a user to personalize a physical card that may be used for transactions. The card-personalization system may assign the user a user code. The user code may be a random set of alphanumeric characters and may be independent of other user-specific authentication information, such as usernames, passwords, or personal identification numbers chosen by or provided to the user for use in connection with the entity issuing the card. The user code may be used to authenticate the user to access personal or sensitive information associated with personalizing the physical card. In some aspects, personalizing the physical card may include a disjointed, multi-step process requiring selection of an image by the user, multiple steps in a process for generating the physical card by personalization system. The user code used to authenticate the user on the card-personalization system may also be used to identify the user's position in the process for personalizing the physical card.

In some aspects, the user code assigned to the user may be stored in a database of the card-personalization system. The database may also include user information known by the card-issuing entity and corresponding to the user (e.g., name, address, etc.). The database may also include a status identifier corresponding to different steps in the card-personalization process. In some aspects, the database may store the user code and the status identifier in a manner that associates the user code and the status identifier with the user information corresponding to the user.

The physical cards personalized using a card-personalization system, according to some aspects, may be issued to or purchased by a user for conducting particular transactions. One example of a physical card that may be personalized and generated using a card-personalization system is a payment card, such as a debit card, credit card, or stored value card, associated with a user account and used to pay for goods or services from a user account. Another example of a physical card is an automated teller machine ("ATM") card associated with a user account and used to perform deposit and withdrawal transactions into and from the user account. Other non-limiting examples of physical cards that may be personalized using a card-personalization system include gift cards, calling card, rewards cards, etc.) In certain instances, a card-issuing entity may allow a user to personalize a physical card. In one example, the user may be allowed to upload or to select an image to be placed on the card. The image may be a personal image provided by the user, a stock image selected by the user from a gallery of images provided by the card-issuing entity, or a previously stored image that the card-issuing entity associates with the user (e.g., a security photograph). The card-personalization system may be accessible to the user on a network via a network resource.

In some aspects, a network platform may include multiple network resources linked to, or otherwise allowing access to, the card-personalization system. The card-personalization system according to some aspects may assign a user code to a user and may use the user code to authenticate the user on the system from any of the points of access to the card-personalization system from the network resources. Also, the card-personalization system may also use the user code to determine the user's position in the card-personalization process. In some aspects, using the user code to both authenticate the use and identify the user's status in the card-personalization process may result in fewer calls to the database for retrieving information. Also, using a user code separate from other user-specific authentication information may allow a user to access the card-personalization system from multiple access points on the network without concern for whether the network resource from which the user navigated to the system required separate authentication information. Further, the dual purposes of the user code both to authenticate the user and determine a position of the user in the card-personalization process may save processing time and resources by reducing the number of user interfaces generated by the system and the number of data transfers between the user device and the system via the network.

These illustrative examples are provided to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 is a block diagram depicting a network environment 100 for accessing a card-personalization system 102 from multiple network resources 104A-D according to some aspects of the present disclosure. The card-personalization system 102 includes a computer system for generating a personalized physical card issued to or purchased by the user from a card-issuing entity. The card-personalization system 102 may be a personalized or private network resource and may authenticate a user prior to allowing the user to generate the personalized physical card using the card-personalization system 102. The card-personalization process may be a disjointed process including multiple, disparate steps for generating a personalized physical card. For example, an image selected by the user may require a separate approval process for determining whether the image is appropriate for placement on the card. The image approval process may take into account factors such as the image resolution, the image data size, whether the image is virus-free, whether the image is copyright protected, etc. The card-personalization system 102 may associate a status identifier with the user to determine the user's position in the process each time the user accesses the card-personalization system 102 via the network 106.

The card-personalization system 102 is communicatively coupled to each of the network resources 104A-D via a network 106. In some aspects, each of the network resources 104A-D may serve as a point of access to the card-personalization system 102 for a user via a user device communicatively coupled to the network 106. For example, each of the network resources 104A-D may include a link, option, or other point-of-entry to the card-personalization system 102 via the network 106. The network resources 104A-D include website resources 104A representing one or more web sites that may be located on a network platform hosted by the card-issuing entity. The website resources 104A may include a combination of public resources that do not require authentication for a user to access and personalized resources that contain information sensitive to a user and requiring user authentication to access. For example, the website resources 104A may include a series of webpages to various products and services offered for sale by the card-issuing entity. The website resources 104A may each include a hyperlink or other access point to the card-personalization system 102. In one example, a user may navigate to the card-personalization system 102 from a website resource 104A requiring authentication. In this example, the user may have previously entered authentication information to access the website resource 104A prior to navigating to the card-personalization system 102. In another example, a user may navigate to the card-personalization system 102 from a website resource 104 that is public and does not require authentication, so may not have previously entered authentication information upon navigating to the card-personalization system 102. The network resources 104A-D also includes portal resources 104B. The portal resources 104B may represent one or more portal sites requiring user authentication to access. A user navigating to the card-personalization system 102 from the portal resources 104B may have previously entered authentication information prior to navigating to the card-personalization system 102.

The network resources 104A-D also include an access point to the card-personalization system 102 via a link included in an electronic mail message or a text message, message link 104C. For example, the message link 104C may be a web link, such as a hyperlink or uniform resource locator ("URL"). In some aspects, the web link may include a user code allowing the user to be authenticated without requiring separate entry of the user code to access the card-personalization system 102. An email or text message containing the message link 104C may be provided to the user following a request from the user to personalize a card. In some aspects, the message link 104C may be provided when the request is not made via a network resource 104A-D. For example, the user request may be made at a user central location. The user central location may include, but is not limited to, a brick-and-mortar building where the user made an in-person request for a personalized card, an interactive machine, such as an automated teller machine ("ATM") or self-service kiosk, a 24-hour accessible interactive voice response ("IVR") system, or a phone agent. Once the request is made, the card-issuing entity may transmit a personalized email or text message to the user including a web link for accessing the card-personalization system 102.

The network resources 104A-D also includes a mobile application 104D. The mobile application 104D may include a client-side application stored on a user device, such as a smartphone or personal digital assistant ("PDA") device, and corresponding to a server-side application engine of the card-personalization system 102 or another network resource (e.g., network resources 104A-C) that is communicatively coupled to the card-personalization system 102 and hosted by a card-issuing entity. The mobile application 104D may access the card-personalization system 102 via the network 106. In some aspects, the mobile application 104D may require authentication information to access one of the network resources 104A-C and may, indirectly access the card-personalization system 102 via links or other options on the network resources 104A-C. In one example, a user may be required to enter authentication information to access one of the network resources 104A-C prior to navigating to the card-personalization system 102. In other aspects, the mobile application 104D may be an application allowing direct access to the card-personalization system 102 via the network 106 and dedicated for allowing the user to personalize and generate a physical card.

Figure 2:
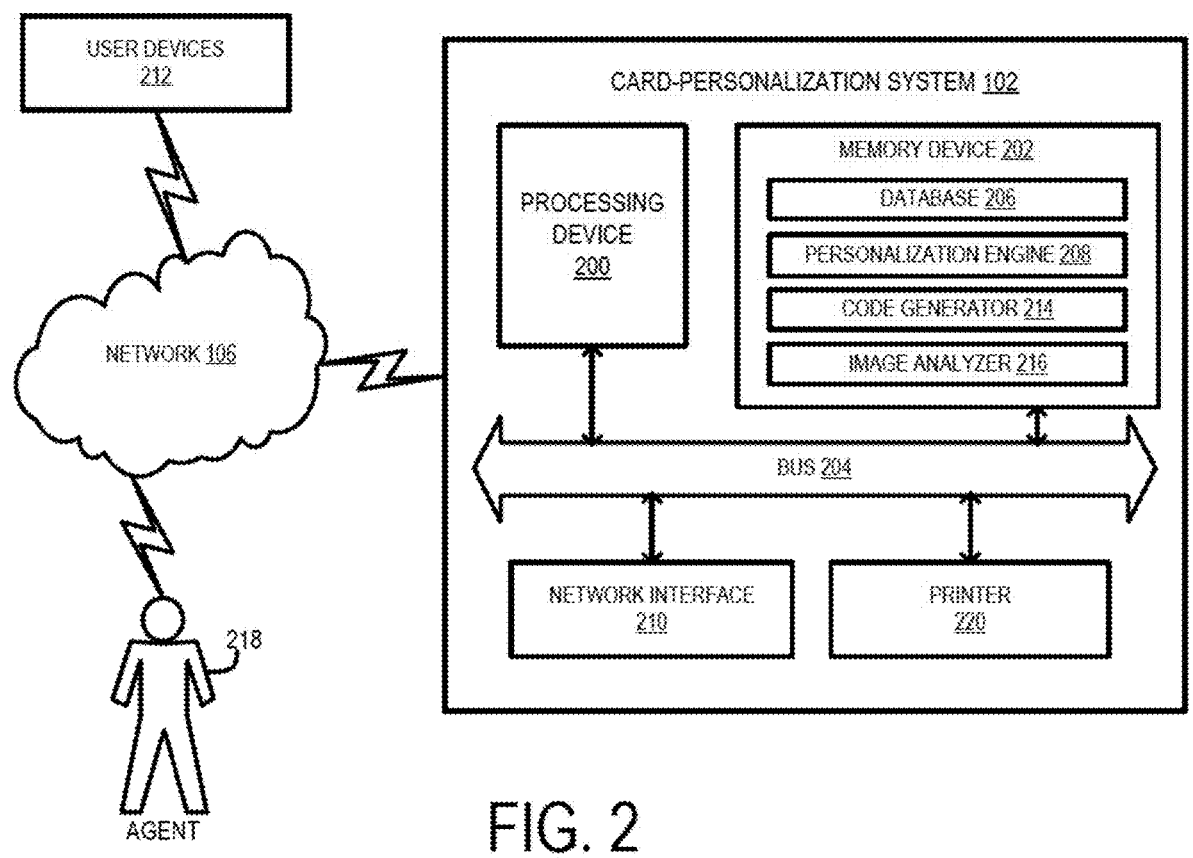
FIG. 2 is a block diagram depicting the card-personalization system of FIG. 1 according to some aspects of the present disclosure.

FIG. 2 is a block diagram depicting the card-personalization system 102 of FIG. 1 according to some aspects of the present disclosure. The card-personalization system 102 includes a processing device 200, a memory device 202, and a bus 204 connecting the processing device 200 to the memory device 202. The processing device 200 may execute one or more operations for personalizing a physical card. The processing device 200 may execute instructions stored in the memory device 202 to perform the operations. The processing device 200 may include one processing device or multiple processing devices. Non-limiting examples of the processing device 200 may include a field-programmable gate array, an application-specific integrated circuit ("ASIC"), and a microprocessor. The memory device 202 may include any type of storage device that retains stored information when the powered off. For example, the memory may be included in a database 206 that may be used to store information and instructions. The database 206 may include one database or multiple databases. Non-limiting examples of the memory device 202 include electrically erasable and programmable read-only memory, a flash memory, or any other type of non-volatile memory.

In some examples, at least a portion of the memory device 202 may include a computer-readable medium from which the processing device 200 can read instructions of the memory device 202. A computer-readable medium may include electronic, optical, magnetic, or other storage devices capable of providing the processing device 200 with computer-readable instructions or other program code. Non-limiting examples of a computer-readable medium include magnetic disks, memory chips, read-only memory, random-access memory, an ASIC, a configured processor, optical storage, or any other medium from which the processing device 200 may read instructions. The instructions may include processor-specific instruction generated by a compiler or an interpreter from code written in any suitable computer-programming language, including, for example, C, C++, C #, COBOL, Java, etc. The instructions may include an application, such as a personalization engine 208, that, when executed by the processing device 200, may cause the processing device 200 to generate a user interface or a series of user interfaces for allowing a user to input or select an image. The database 206 may store information received from a user via the user interfaces generated by the personalization engine 208.

The card-personalization system 102 also includes a network interface 210 coupled to the bus 204. The network interface 210 may be a network card or other device positioned in the card-personalization system 102 to be communicatively coupled to the network 106 and to allow user devices 212 to access the card-personalization system 102 via the network 106. In some aspects, the user devices 212 may access the card-personalization system 102 by connecting to a network resource 104A-D of FIG. 1 via the network 106 and navigating to the card-personalization system 102 from the network resource 104A-D. The network interface 210 may receive information from the user devices 212 or other network resources (e.g., network resources 104A-D of FIG. 1) over the network 106 and provide the information to the card-personalization system 102. The network interface 210 may be communicatively coupled to the database 206 via the bus 204 to transmit information received over the network 106 to the database 206. In one example, the personalization engine 208 may generate a user interface to receive information (e.g., an image selection) from the user via the user device 212 connected to the network 106. The user interface may be transmitted to the user device 212 over the network 106 via the network interface 210. The network interface 210 may receive the information input or selected by the user via the user interface and store the information in the database 206.

In some aspects, the database 206 may include additional information associated with the user. For example, the database 206 may include user-identifying information. In some aspects, the user-identifying information may include account information corresponding to accounts of the user with the card-issuing entity. The user code may be associated with the account information in the database to allow the card-personalization system 102 to authenticate the user using the user code. In some aspects, the account information may include a personalization plan having a subset of the account information that may be used to generate the personalized card. For example, the account information may include an account number, an expiration date for a physical card, a user name, and other information that may be applied to the physical card to generate the personalized card.

The card-personalization system 102 may also include a code generator 214. The code generator 214 may include a computational device in the memory device 202. In some aspects, the code generator 214 may include algorithms executable by the processing device 200 to generate a random or pseudo-random sequence of alphanumeric characters that may be used as user codes to authenticate a user to access the card-personalization system 102. In some aspects, the code generator 214 may be used in response to a request from a user or system to assign a user code to the user. The user code generated by the code generator 214 may be a unique identifier for the user. The card-personalization system 102 may assign the user code generated by the code generator 214 to a user by storing the user code in the database 206 in a manner that associates the user code with the user. Although the code generator 214 is shown as a computational device of the memory device 202, the code generator 214 may be implemented in the card-personalization system 102 as a physical device connected to the processing device 200 and the database 206 via the bus 204 without departing from the scope of the present disclosure.

The card-personalization system 102 may also include an image analyzer 216. The image analyzer 216 may be a computational device in the memory device 202 configured to analyze an image to determine characteristics or properties of the image. In some aspects, the image analyzer 216 may include algorithms executable by the processing device 200 for executing instructions to determine image properties, including, but not limited to, resolution, size, sharpness, etc. In additional and alternative aspects, the image analyzer may include an image comparison module that may be configured to compare images stored in the database 206 with other images accessible to the image analyzer 216. For example, the image comparison module may include matching algorithms for selecting points on a stored image to compare or correlate to points on another image. The image comparison device may be used to determine the subject matter of the image for identifying stored images within a restricted subject matter (e.g., lewd images, malicious images, copyrighted images, etc.). In other aspects, the image analyzer 216 may include instructions to extract image properties stored as metadata in the image file containing the image.

In additional and alternative aspects, the card-personalization system 102 may also be configured to require human analysis of images stored in the database 206. The card-personalization system 102 is communicatively coupled to an agent 218 via the network 106 that may receive an image for approving or rejecting the image based on determined image guidelines or restrictions. In some aspects, the agent 218 may be an employee, contractor, or agent of the card-issuing entity. The agent 218 may be communicatively connected to the card-personalization system 102 via the network 106 using a computing device. In some aspects, the memory device 202 may include additional instructions executable by the processing device 200 to cause the processing device 200 to generate a report including the image and the user code. For example, the report may include a number of images received by multiple different users and may include the user codes for identifying the user to which each image is associated. The use of the user code may allow the images to be transmitted between the card-personalization system 102 and the agent 218 in a secure manner without compromising the identity of the user. The agent 218 may approve or reject each of the images and transmit the results of the approval process back to the card-personalization system 102 as an approval report including the results associated with the user codes. In some aspects, the results may be stored in the database 206 and associated with the user using the user code associated with the image on the approval report. Although the agent 218 is described as coupled to the card-personalization system 102 via the network 106, the card-personalization system 102 and agent 218 may transmit information via any means without departing from the scope of the present disclosure. For example, the images and user code may be retrieved from the database 206 and stored on a storage device with that may be transported to the agent 218 for analysis. In another example, the report may be printed and hardcopies of the images and user codes may be transported to the agent 218.

The card-personalization system 102 also includes a printing subsystem 220. The printing subsystem 220 may include a printer configured to print or otherwise apply an image onto a physical card. In some aspects, the printer may be configured to apply the image directly onto the physical card. In other aspects, the printer may be configured to apply the image to a material that may be adhered to the physical card to create the personalized card. In some aspects, the printing subsystem 220 may also include indention tools to create indentions in the physical card that form alphanumeric characters corresponding to user information stored as a personalization plan in the database. For example, the indention tools may create indentions in the physical card to apply a user name, account number, and expiration date onto the card. In some aspects, the printing subsystem 220 may also include additional tools to personalize the card. For example, the printing subsystem 220 may include mechanical tools to add a metallic strip onto the physical card or embed a chip into the physical card, as well as additional tools to transfer user information (e.g., the account number) or other information of the card-issuing entity into the metallic strip or chip. Although the printing subsystem 220 is shown in FIG. 2 as included in the card-personalization system 102, the printing subsystem 220 may be a system separate from the card-personalization system 102 without departing from the scope of the present disclosure. For example, the printing subsystem 220 may be communicatively coupled to the card-personalization system 102 via the network 106.

Figure 3:
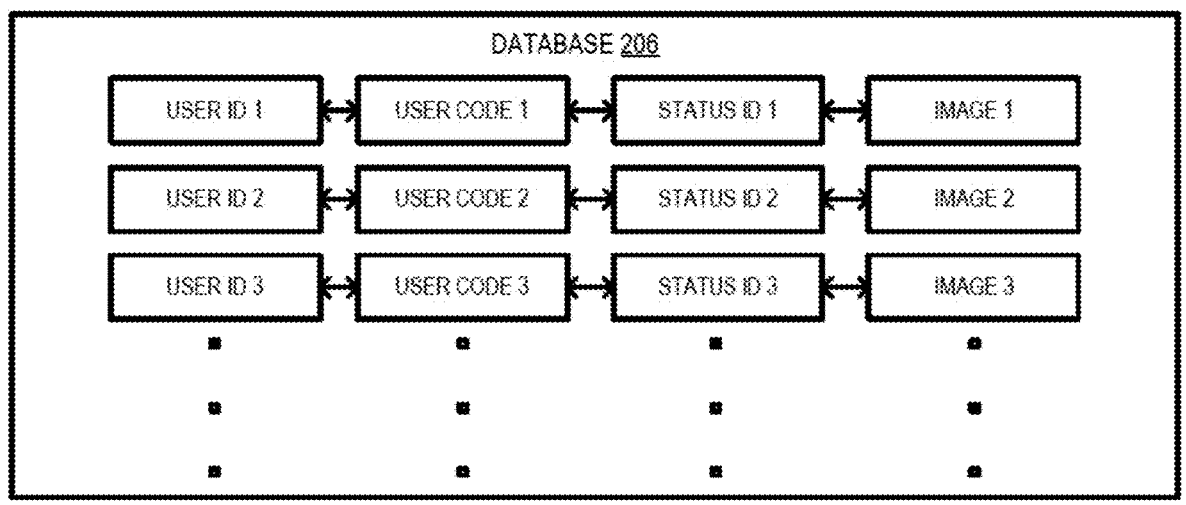
FIG. 3 is a block diagram depicting an example of the database of FIG. 2 according to some aspects of the present disclosure.

FIG. 3 is a block diagram depicting an example visualization of the database 206 of FIG. 2 according to some aspects of the present disclosure. The database 206 may include user-identifying information, User ID 1-3, user codes associated with the user, User Code 1-3, status identifiers corresponding to a position of the user in the card-personalization process, Status ID 1-3, and images inputted or selected by the user during the card-personalization process, Image 103. Although only identifying information, user codes, status identifiers, and images are described, the database 206 may store additional information without departing from the scope of the present disclosure.

The identifying information associated with the user of the card-personalization system 102 may include any information corresponding to the identity of the user. Non-limiting examples of the identifying information include a name, an address, account numbers, social security numbers, and personal identification numbers. In some aspects, this information may be retrieved from other systems hosted by the card-issuing entity and stored in the database 206 when the user requests to personalize a physical card using the card-personalization system 102 of FIG. 2. In other aspects, the database 206 may be a shared database with the other systems and may include the identifying information stored for purposes of accounts associated with the user or other activities initiated by the user using systems hosted by the card-issuing entity. All or a portion of the identifying information may be including in a personalization plan. The personalization plan may include specific identifying information that may be included on the physical card (e.g., the name, account number, expiration date, a stored signature, etc.).

The user codes assigned to a user may be generated by the code generator 214 of FIG. 2 and stored in the database 206. In some aspects, the user codes may be assigned to the users by storing the user codes in the database 206 in a manner that associates the user codes with the user. For example, FIG. 3 shows a visual representation of an example of user codes stored in the database 206 in a table. Each row of in the table may represent a different user. Information stored in the same row may be linked or otherwise associated together in the database 206. For example, User Id 1, User Code 1, Status ID 1, and Image 1 may all be associated with a first user of the card-personalization system 102 of FIG. 2. User Id 2, User Code 2, Status ID 2, and Image 2 may be associated with a second user of the card-personalization system 102. User Id 3, User Code 3, Status ID 3, and Image 3 may be associated with a third user of the card-personalization system 102. In some aspects, the database 206 may include a marker, or other indicator, with the user information, user code, and status identifier to link them together or with the user.

The status identifier, Status Identifier 1-3, for each user may correspond to the respective user's position in the card-personalization process. The status identifiers may be associated with the users to allow a user to resume the card-personalization process from a predetermined benchmark in the process at a later time. In some aspects, the card-personalization process may be disjointed and include predetermined benchmark positions such as: (1) receiving a card design (e.g., an image), or a selection of a card design, from a user via an input on a user interface, (2) storing the image in the database 206 pending approval of the image, (3) a multi-tiered approval step, including (a) an automated approval process by the image analyzer 216 and (b) a manual approval process by the agent 218, (3) storing approval results (e.g., approval or rejection) in the database 206, (4) transmitting the image and a personalization plan to the printing subsystem 220 for generating the personalized card, and (5) pending further action following a rejection of the image (e.g., returning to the "selecting a card design" benchmark).

For example, a user may select an image for a physical card and submit the image for approval by the card-personalization system 102. The approval may take a number of days, preventing the user from maintaining a secure connection to the card-personalization system 102 until the next step in the process. The user may return to the card-personalization system 102 and enter the user code. Based on the user code, the status identifier associated with the user and user code may cause a user interface to be generated displaying the position of the user in the card-personalization process.

Figure 4:
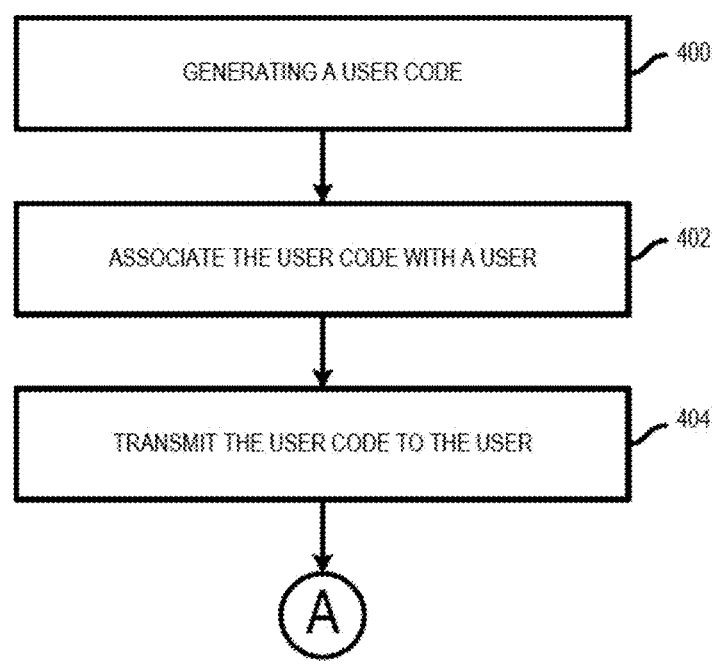
FIG. 4 is a flow chart depicting a process for assigning a user code for the card-personalization system of FIG. 2 according to some aspects of the present disclosure.
Figure 5:
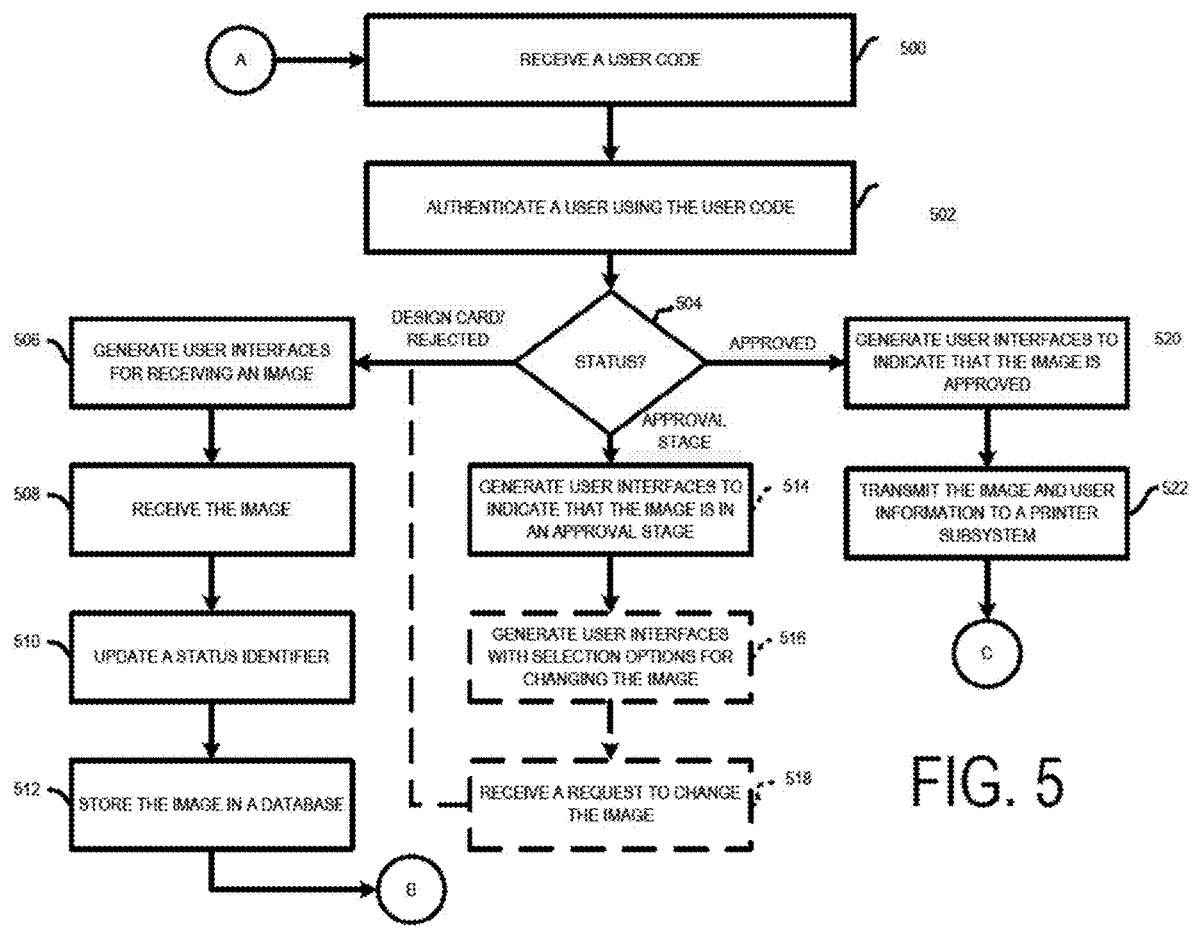
FIG. 5 is a flow chart depicting a process for authenticating a user to design a physical card using the card-personalization system of FIG. 2 according to some aspects of the present disclosure.

FIGS. 4 and 5 are flow charts illustrating examples of processes that may be used to generate a personalized physical card using the card-personalization system 102 of FIG. 2. The processes are described with respect to the components described in FIGS. 1 and 2 unless otherwise indicated, although other implementations are possible without departing from the scope of the present disclosure.

FIG. 4 is a flow chart depicting a process for assigning a user code for the card-personalization system 102 of FIG. 2 according to some aspects of the present disclosure.

In block 400, a user code is generated in response to receiving a request to personalize a physical card. In some aspects, the card-personalization system 102 may receive the request to personalize the card as a request for a user code. For example, the request for a user code may be received from a user via a user device 212 communicatively coupled to the card-personalization system 102 via the network. In another example, the request for a user code may be received from an agent or other representative of the card-issuing entity on behalf of the user in response to a user indicating a desire to generate a personalized card to the representative. In alternative and additional aspects, the user may request to personalize a physical card prior to requesting a user code. For example, the card-personalization system 102 may allow a user to select an image without requiring user authentication or otherwise providing identifying information. The user may subsequently be required to select or create an account and enter identifying information that may be stored in the database 206. The card-personalization system 102 may cause the code generator 214 to generate a random code that may serve as the user code for the user. In some aspects, the user code may be a set of alphanumeric characters that the user may enter to authenticate the user on the card-personalization system 102.

In block 402, the card-personalization system 102 may associate the user code with a user. In some aspects, the user may be assigned a user code in response to a request for a user code as described in block 400. In other aspects, the user may be assigned the user code in response to a request for identifying information from the user subsequent to the user selecting an image for personalizing the card as described in block 400. In some aspects, the card-personalization system may associate the user code with the user in the database. The card-personalization system 102 may assign the user code to the user by storing the user code in the database 206 in a manner that links or otherwise associates the user code with other user-identifying information of the user. In some aspects, the card-personalization system 102 may include a link or marker with the user code to associate the user code to the other user-identifying information in the database 206. In other aspects, the card-personalization system 102 may store the user code on a same row in a table with the identifying information as illustrated by the database 206 in FIG. 3.

In block 404, the card-personalization system may transmit the user code to the user. In some aspects, the card-personalization system 102 may transmit the user code to an agent of the card-issuing entity. The agent may transmit the user code to the user via an email. In other aspects, the card-personalization system 102 may generate one or more user interfaces displaying the user code on a display of the user device 212 used by the user to access the card-personalization system 102. In further aspects, the card-personalization system 102 may cause the printing subsystem 220 to print the user code. The printed user code may be transmitted to the user via mail or by hand from the card-issuing entity. After the card-personalization system 102 is received by the user, the user may subsequently access the card-personalization system 102 via the network 106 to generate a personalized physical card.

FIG. 5 is a flow chart depicting a process for authenticating a user to design a physical card using the card-personalization system of FIG. 2 according to some aspects of the present disclosure.

In block 500, the user code is received from the user. In some aspects, the personalization engine 208 may generate a user interface including an input option to allow a user to input a user code assigned to the user as described in the process of FIG. 4. The user code may be entered and a signal corresponding to the user code may be transmitted to the card-personalization system 102 from the user device 212 displaying the user interface over the network 106. The card-personalization system 102 may receive the signal via the network interface 210.

Figure 6:
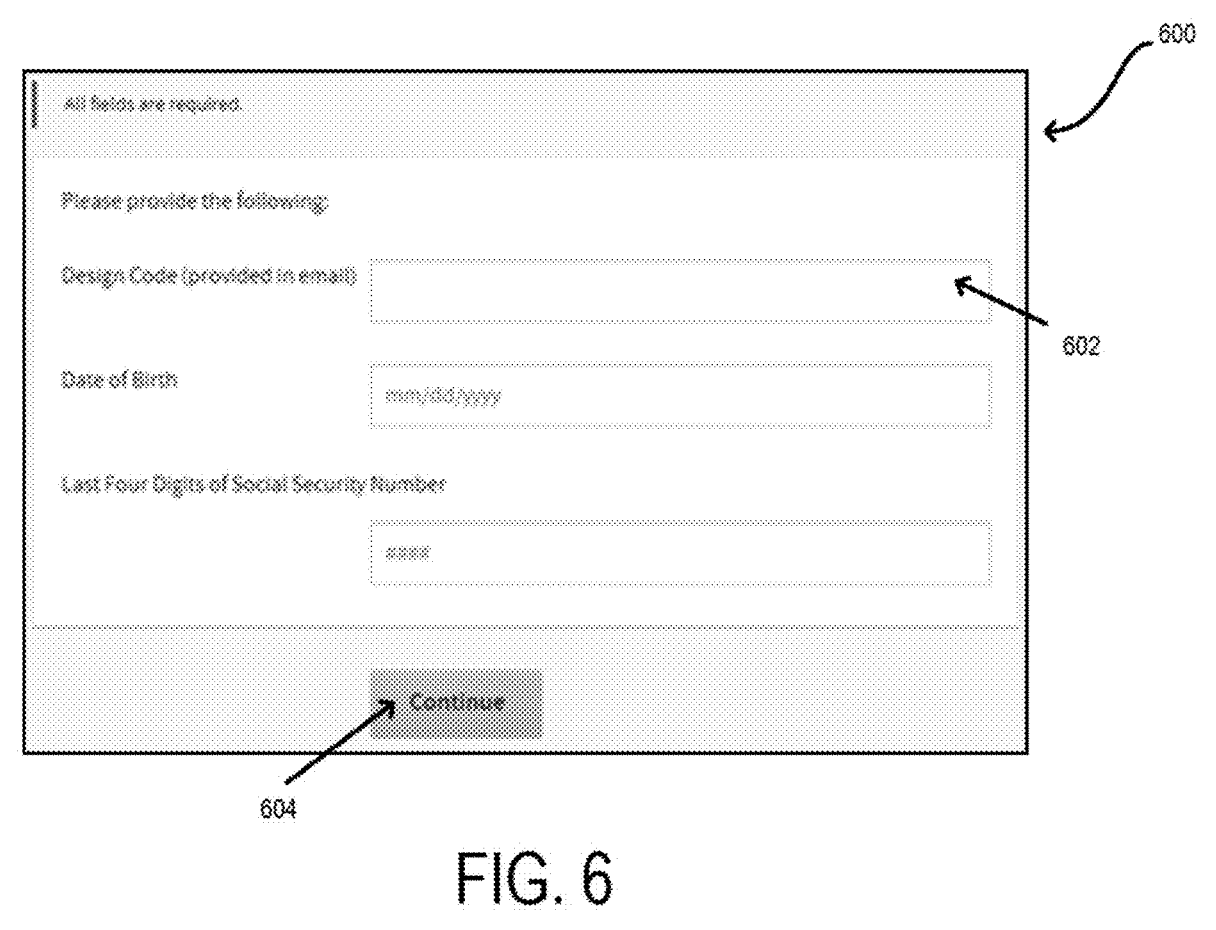

FIG. 6 is an example of a user interface 600 that may be generated by the personalization engine 208 to receive the user code. The user interface 600 includes an input option 602 that may be selected by a user via a selection tool of the user device 212. A user may enter the user code into the input option 602 via a keyboard tool of the user device 212. The user may subsequently select the selection option 604 labeled "Continue" subsequent to inputting the user code into the input option 602. In response to selecting the selection option 604, the signal corresponding to the user code may be generated and transmitted to the card-personalization system 102 via the network 106.

Returning to FIG. 5, in block 502, the user is authenticated using the user code. In some aspects, the card-personalization system 102 may compare the user code received by the user with a user code assigned to the user in the database 206. Upon determining that the user code received in block 500 matches a user code stored in the database 206, the card-personalization system 102 may authenticate the user based on the identifying information associated with the user code in the database 206. In some aspects, the user may be authenticated for a predetermined amount of time to allow the user to navigate away from the card-personalization system 102 to other network resources 104A-D and return to the card-personalization system 102 without requiring the user to reenter the user code. For example, the card-personalization system 102 may transmit a cookie to the user device 212 of the user with a unique session identifier. In additional and alternative aspects, the card-personalization system 102 may temporary store a timestamp in the database 206 and associate the timestamp with the user. The timestamp may correspond to a time that the user was authenticated on the card-personalization system 102 using the user code. The card-personalization system 102 may allow the user to remain authenticated for a predetermined amount of time and may compare the current time to the stored timestamp to determine whether the authentication has expired.

In block 504, the card-personalization system 102 determines a position of the user in the card-personalization process. In some aspects, the card-personalization system 102 may determine the position of the user by retrieving a status identifier from the database 206 corresponding to the user's position in the process. The status identifier may be associated with the user code and may be retrieved from the database 206 using the user code. In some aspects, the status identifier may be retrieved from the database 206 simultaneous with the card-personalization system 102 authenticating the user using the user code as described in block 502. In some aspects, the status identifier may indicate whether the user is beginning the process to design a card, whether an image selected by the user is in the approval stage, whether the image is approved, or whether the image is rejected. Blocks 506-512 may represent a process of the card-personalization system 102 that may be implemented in response to a signal indicating that the user has not yet designed a card or that a selected image was rejected. Block 514 and block 520 represent a process of the card-personalization system 102 in response to a signal indicating that a selected image is in an approval stage or has been approved, respectively.

In block 506, one or more user interfaces is generated to allow a user to input or select an image for personalizing a physical card. In some aspects, the card-personalization system 102 may generate the user interfaces in response to a determination that the user has not yet selected an image for the physical card. For example, the status identifier associated with the user in the database 206 may indicate that the user has not started the card-personalization process or that no image is saved in the database 206 or associated with the user. In another aspect, the card-personalization system 102 may generate the user interfaces in response to a determination that an image previously selected by the user has been rejected. The user interfaces may allow the user to restart the process and select a new image for the physical card.

In some aspects, the user interfaces may include one or more input options to allow a user to upload or otherwise input an image stored on the user device 212 of the user. In other aspects, the image may be selected from a list of images displayed to the user with selection options for choosing the image. For example, the database 206 may include a gallery of stock images corresponding to different themes (e.g., nature, animals, sports, art, etc.). The user interfaces may present the stock images to the user for selection of a desired image for the physical card.

Figure 7:
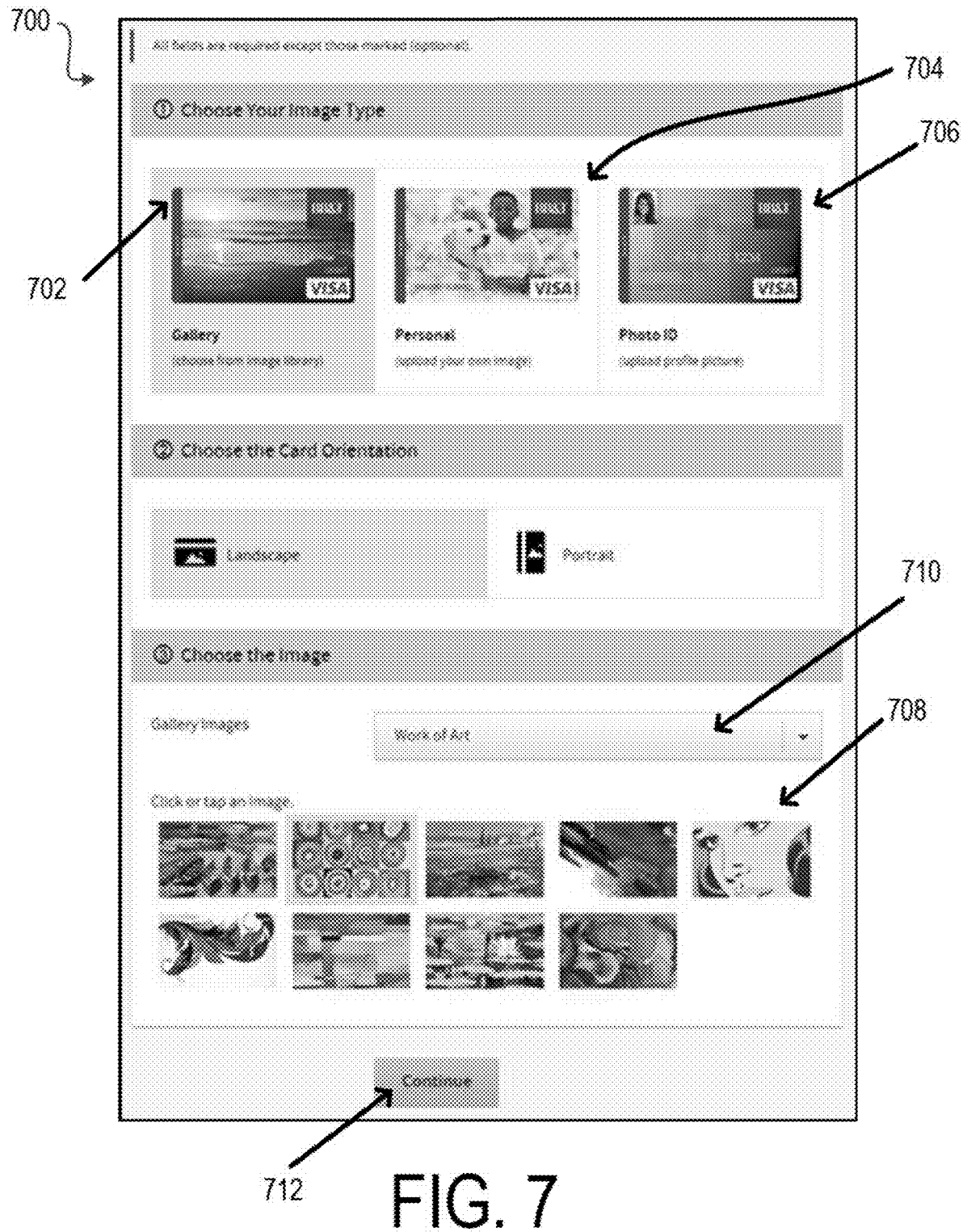
FIG. 7 is an example of a user interface generated by the system of FIG. 1 for receiving a selection of an image according to some aspects of the present disclosure.

FIG. 7 is an example of a user interface 700 for receiving a selection of an image. The user interface 700 includes a set of options to allow a user to select the type of image for personalizing the physical card. The set of options includes a selection option 702 labeled "Gallery" that may be selected by the user via a selection tool of the user device 212 to allow the user to select an image from a gallery of stock images. The options also include selection options 704, 706 labeled "Personal" and "Photo ID," respectively. The selection option 704 may allow a user to upload an image stored on the user device 212 for personalizing the physical card. In some aspects, the selection option 706 may allow a user to upload an image including the user's face or profile to personalize the physical card.

Subsequent to the user selecting the selection option 702 to indicate a desire to choose an image from a gallery of stock images, the user may select an image from an image gallery 708 that includes thumbnails of images that may be selected by the user for personalizing the physical card. The image gallery 708 may correspond to a set of images related to a theme selected by the user via the pull-down menu 710 selection option shown in FIG. 7. For example, the pull-down menu 710 indicates a theme of images related to "Work of Art" and may cause the system 102 to display images related to known works of art. Subsequent to a selection of an image from the image gallery 708, the user may select the selection option 712 labeled "Continue." In response to a selection of the selection option 712, a signal may be generated and transmitted to the system 702 to indicate the selected image.

Figure 8:
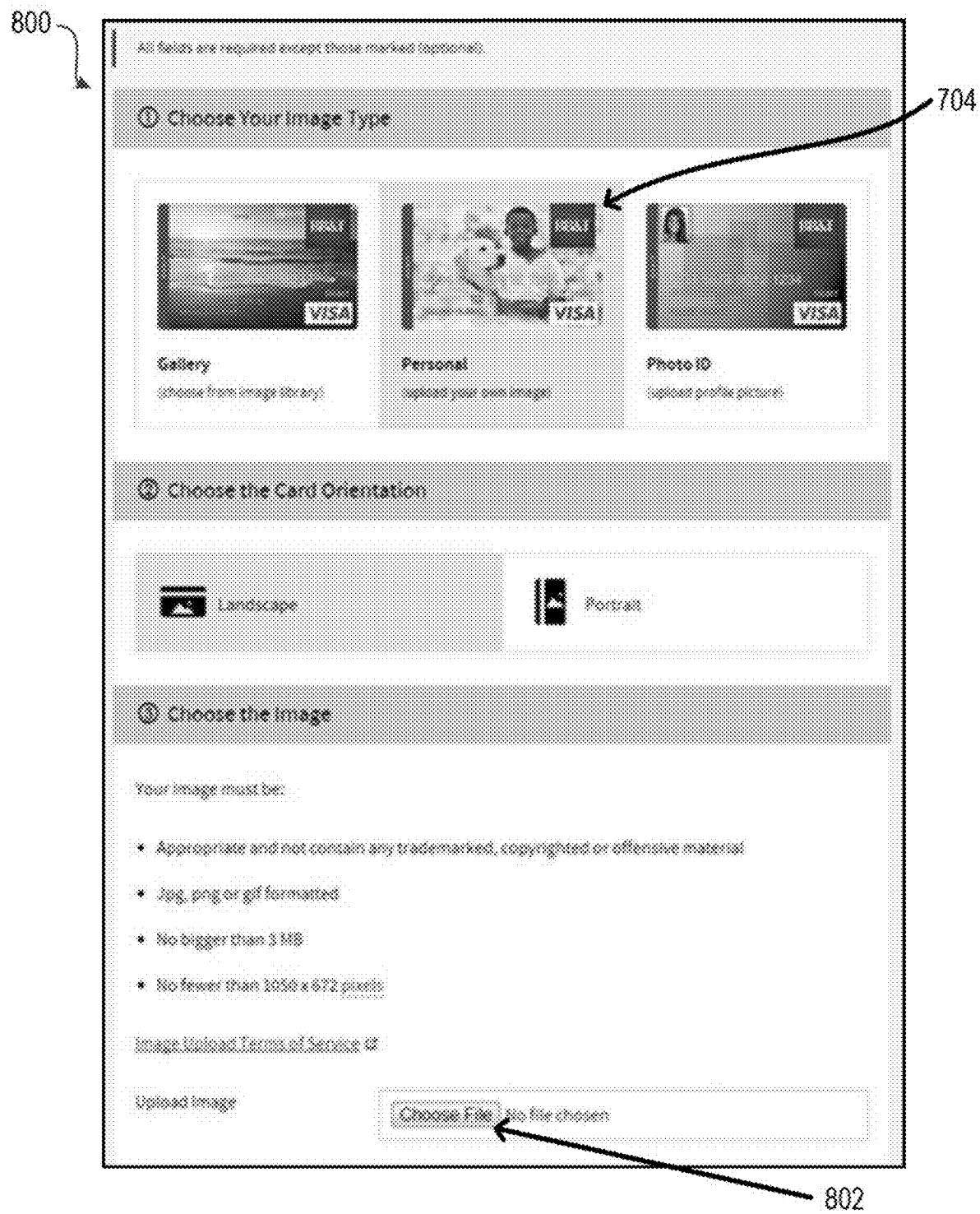
FIG. 8 is an example of a user interface generated by the system of FIG. 1 for receiving an image according to some aspects of the present disclosure.

FIG. 8 is an example of a user interface 800 that for receiving an image from a user in response to a selection of the selection option 704 labeled "Personal." The user interface 800 may include a selection option 802 labeled "Choose File." The user may select the selection option 802 via a selection tool of the user device 212. A window may be displayed to the user including one or more files stored on the user device 212 that may be selected by the user and uploaded, or transmitted to the system 102 as an image for the personalized card.

Returning to FIG. 5, in block 508, the image is received. In some aspects, subsequent to a selection or input of an image, the signal may transmit a signal corresponding to the selected image. For example, the image may be uploaded by the user using a user device 212 displaying the user interface 800 to cause the user device 212 to transmit a signal over the network 106 to the card-personalization system 102. In another example, the image may be selected from a set of stock images displayed on the user interface 700. Selecting an image by the user may cause a signal to be transmitted over the network 106 to the card-personalization system 102 representing the selected image (or the image's location in the database 206).

In block 510, the status identifier is updated. For example, the status identifier may be modified or updated from an identifier indicating that the user has not yet selected an image to an identifier indicating that the image is entering the approval stage. The updated status identifier may be stored in the database 206 and associated with the user. In some aspects, the previous identifier may be deleted from the database 206.

In block 512, the image is stored in the database 206. In some aspects, the image is stored in the database 206 with metadata corresponding to properties of the image. In other aspects, the image may be stored in the database 206 as a link to a copy of the image stored with a set of stock images for presenting to the user. The image may be stored in a manner that associates the image with the user. For example, the image may be stored in a table of the database 206 on the same row as identifying information, a user code, or a status identifier associated with the user. The card-personalization system 102 may subsequently retrieve the image from the database 206 to perform an approval process prior to generating a physical card including the selected image.

In subsequent visits to the card-personalization system 102 by the user, the card-personalization system 102 may determine (in block 504) that the image is in an approval stage and proceed to block 514. In block 514, one or more user interfaces is generated to indicate that the image is in the approval stage. In some aspects where the approval stage includes multiple levels of approval, the user interfaces may indicate a level of the approval stage for the image.

Figure 9:
FIG. 9 is an example of a user interface generated by the system of FIG. 1 for displaying an approval status according to some aspects of the present disclosure.

FIG. 9 is an example of a user interface 900 for displaying an approval status of the image selected or input by the user. The user interface includes a message 902 indicating that the image is in an approval step in the card-design process and that, if approved, an estimated date of delivery of the personalized card. The user interface 900 also includes a preview 904 of the personalized card including the image selected by the user.

In some aspects, the card-personalization system 102 may optionally allow the user to cancel or retrieve the image in the approval stage and to select a new image for personalizing the physical card. Blocks 516 and 518 are dashed blocks in FIG. 5 to indicate that the steps are optional. In block 516, one or more user interfaces are generated and include one or more selection options to allow the user to change a previously selected image. In some aspects, the user interfaces may be the same user interfaces informing the user that the previously selected image is in the approval stage, as described in block 514. The selection option may include a hyperlink, button, or other option that is selectable by the user via the user device 212 used to access the card-personalization system 102.

In block 518, a request to change the previously selected image is received. The request may correspond to the user's selection of the selection option described in block 516. In some aspects, a signal may be generated in response to the selection of the selection option described in block 516 and transmitted to the card-personalization system 102 to indicate the request to change the previously selected image. The card-personalization system 102 may proceed to block 506 and generate user interfaces to allow the user to input or select a new image.

Figure 10:
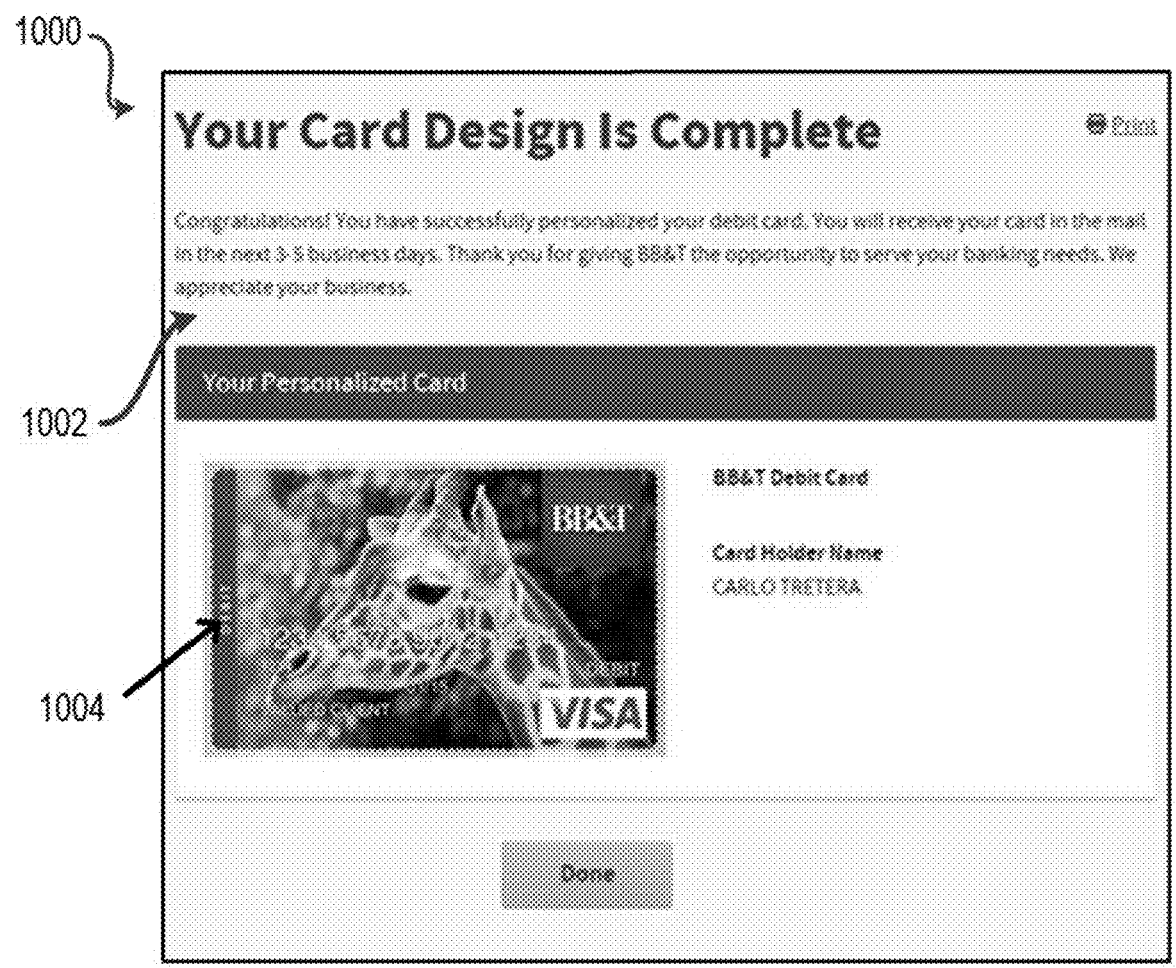
FIG. 10 is an example of a user interface generated by the system of FIG. 1 for displaying an approved status according to some aspects of the present disclosure.

In block 520, the card-personalization system 102 generates one or more user interfaces indicating that the image selected by the user is approved. In some aspects, the user interfaces may include additional information corresponding to the personalized card. For example, the user interface may include a preview of the personalized card and when information corresponding to when the personalized card will be available to the user (e.g., an estimated shipping date, an estimated delivery date, tracking information, a pick-up location, etc.). For example, FIG. 10 is an example of a user interface 1000 that includes a message 1002 including an message indicating that the card design process is complete (e.g., that the image is approved or in a printing step in the card-design process) with an estimated delivery date for the card. The user interface 1000 also includes a preview 1004 of the personalized card including the image chosen by the user.

In some aspects, the user interfaces may optionally allow a user to cancel or retract the approved image and allow the user to select a new image as described in blocks 516 and 518 of FIG. 5. Returning to FIG. 5, in block 522, the card-personalization system 102 transmits the image and user-user-identifying information stored in the database 206 (e.g., a personalization plan including a name, account number, expiration date, etc.) are transmitted to the printing subsystem 220 for generating the physical card.

In additional aspects, the steps for generating a personalized card described in FIG. 5 may also include providing notification to the user via the user device of a change in the status of the user in the card-design process. For example, in response to a change in a status identifier corresponding to a step of the user in the card-design process, the system 102 may generate a message indicated the user's status or next step in the process. In some aspects, the message may be transmitted to the user via an electronic mail message. In additional and alternative aspects, the message may be transmitted by a text message, application alert, or other suitable message to inform the user of the status.

Figure 11:
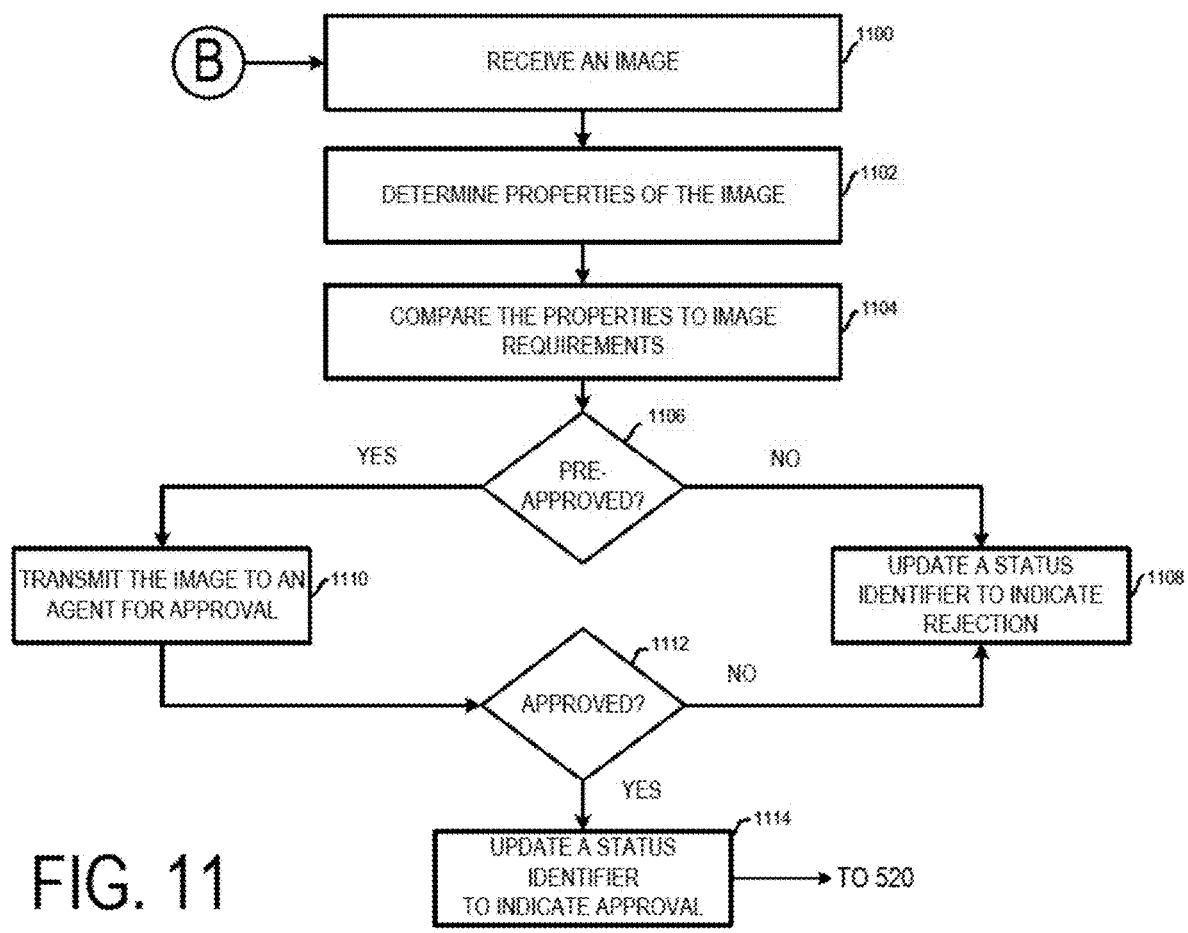
FIG. 11 is a flow chart depicting a process for approving a physical card design using the card-personalization system of FIG. 2 according to some aspects of the present disclosure.

FIG. 11 is a flow chat depicting a process for approving a physical card design using the card-personalization system of FIG. 2 according to some aspects of the present disclosure. The process is described with respect to the components described in FIGS. 1 and 2 unless otherwise indicated, although other implementations are possible without departing from the scope of the present disclosure.

In block 1100, the image is received. In some aspects, the image is received from the database 206 in response to a retrieval call to the database 206 for the image. In other aspects, the image is received from the user as described in block 508 of FIG. 5.

In block 1102, the properties of the image are determined. In some aspects, image properties may be included as information stored in the database 206 with the image. For example, metadata may be stored with or extracted from the image corresponding to properties of the image such as size, resolution, contrast, etc. In other aspects, the card-personalization system 102 may analyze the image to determine the image properties using the image analyzer 216. For example, a key-point matching algorithm of the image analyzer 216 may be executed by the processing device 200 to determine a subject matter associated with the image or if the image corresponds to copyrighted, lewd, or other materials objectionable to the card-issuing entity.

In block 1104, the image properties are compared to image requirements. The image requirements may include required properties determined by the card-personalization system 102 or the card-issuing entity for the card. For example, the card-issuing entity may not allow physical cards to be generated having images below a threshold resolution, outside of a certain size range, having text, or of a certain subject matter (e.g., lewd, copyrighted material).

The image analyzer 216 may compare the image properties to the requirements to determine whether the image meets the requirements.

In block 1106, the card-personalization system 102 determines whether the image is pre-approved. The image may be pre-approved if the comparison of the image properties to the image requirements described in block 1104 indicates that the image meets each of the requirements determined by the card-personalization system 102 or the card-issuing entity. For example, the image may be approved if the resolution of the image is above the required threshold, within the required size range, and includes no text. In some examples, the image may not be approved in if the image is below the required threshold, too large or too small, or includes text.

In block 1108, the card-personalization system 102 updates a status identifier associated with the image to indicate that the image is rejected. In block 1110, the card-personalization system 102, optionally, transmits the image to the agent 218 for final approval. The agent 218 may be a representative of the card-issuing entity tasked with reviewing the images submitted to the card-personalization system 102 by users. In some aspects, the card-personalization system 102 may transmit the image to the agent via the network 106 or a communication link between the card-personalization system 102. In other aspects, the card-personalization system 102 may be transmitted to the system via a download of the image from the card-personalization system 102 by the agent 218 (e.g., onto a disc, universal serial bus device, etc.). In additional aspects, the card-personalization system 102 may transmit the image to the agent via the database 206. For example, the card-personalization system 102 may include an indicator in the database 206 associated with the user information or the image to indicate that the image has been pre-approved. The agent 218 may retrieve the image from the database 206 for final approval.

In block 1112, the card-personalization system 102 may determine whether the image was approved by the agent 218. The card-personalization system 102 may make this determination based on information received from the agent indicating whether the agent has approved the image. In some aspects, the approval information may be transmitted by the agent to the card-personalization system 102 in a similar manner as the transmission of the image to the agent from the card-personalization system 102 (e.g., the network, USB, database 206, etc.). The card-personalization system 102 may update the status identifier using a user code associated with the image to indicate that the image was rejected, as described in block 1108, when the card-personalization system 102 determines that the agent 218 did not approve the image.

In block 1114, the card-personalization system 102 updates the status identifier to indicate that the image is approved or that the physical card is in the process of being generated. In some aspects, the card-personalization system 102 may also update the status identifier associated with the user or image in the database 206 when the image is pre-approved subsequent to the step described in block 1106. Subsequent to updating the status identifier, the card-personalization system 102 may implement the steps described in blocks 520 or 522 to generate a user interface indicating that the image is approved or transmit the image and a personalization plan to the printing subsystem 220, respectively.

Figure 12:
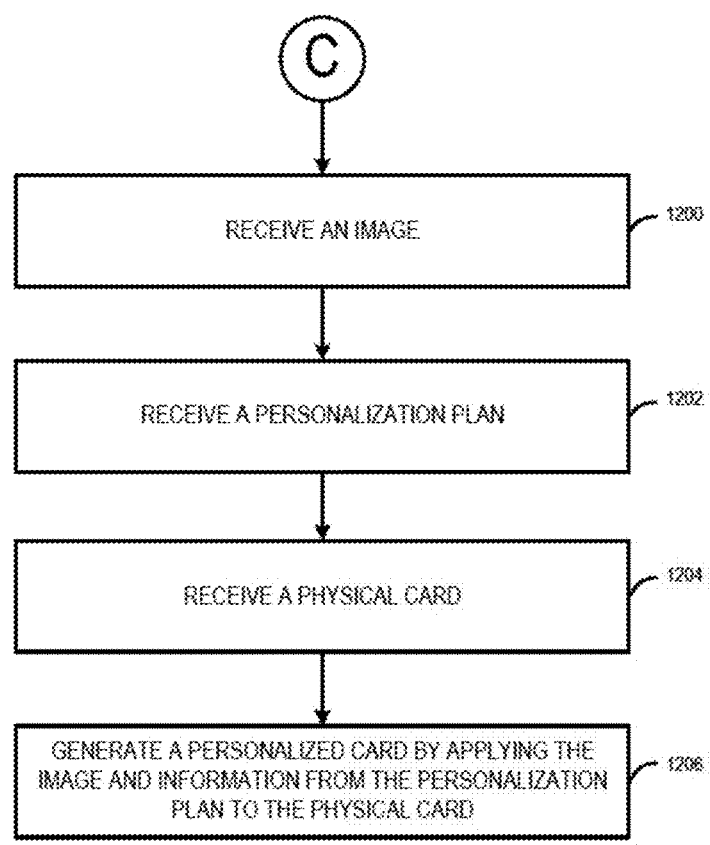
FIG. 12 is a flow chart depicting a process for generating a personalized card using the card-personalization system of FIG. 2 according to some aspects of the present disclosure.

FIG. 12 is a flow chart depicting a process for generating a personalized card using the card-personalization system of FIG. 2 according to some aspects of the present disclosure. The process is described with respect to the components described in FIGS. 1 and 2 unless otherwise indicated, although other implementations are possible without departing from the scope of the present disclosure.

In block 1200, the image is received. In some aspects, the image may be retrieved by the processing device 200 from the database 206 in response to a retrieval call to the database 206 for the image and transmitted to the printing subsystem 220. In additional aspects, the image is received by the printing subsystem 220 with a request that the image be printed or otherwise applied to a physical card. The image may be received by the printing subsystem 220 via the bus 204, or another communication link where the printing subsystem 220 is separate from the card-personalization system 102.

In block 1202, a personalization plan is received. In some aspects, the personalization plan may be received simultaneously with the image as described in block 1200. The personalization plan may include user information that may be applied to the physical card to generate the personalization card. The personalization plan may be stored in the database 206 and associated with the user and the user code. In some aspects, the personalization plan may include a subset of user-identifying information stored in the database 206 and associated with the user. Non-limiting examples of information that may be included in the personalization plan include a name of the user, an account number, a stored signature, and a security photograph. The personalization plan may also include an expiration date that may be determined based on a predetermined timeframe from the transmission of the personalization plan to the printing subsystem 220 (e.g., two years, four years). The personalization plan may also include additional information that does not identify the user, such as information associated with the card-issuing entity or randomly generated for applying to the personalization card (e.g., a security code, a prefix number identifying the card-issuing entity or type of physical card, etc.).

In block 1204, a physical card is received. The physical card may be made of plastic or other rigid material suitable for storing information to allow for a transaction. In some aspects, the physical card may be received prior to the card being tailored to meet the requirements of a particular service or transaction. In other aspects, the step described in block 1202 may be optional and the physical card may already be semi-tailored with user information and only require application of the image to the physical card. For example, the card may contain a magnetic stripe, an embedded computer chip, user-identifying information such as an account number, name, or another data storage unit that contains sensitive information relevant to the service or transaction (e.g., an amount of funds or credit available to the user).

In block 1206, a personalized card is generated. In some aspects, the printing subsystem 220 may apply the image and the personalization plan to the physical card to create the personalized card. In one example, the image may be printed onto an adhesive film that is sized to be placed onto the physical card to personalize the card. In other aspects, the printing subsystem may print the image directly onto the physical card. In additional and alternative aspects, the printing subsystem 220 may engrave or otherwise create indentions on the physical card to apply information from the personalization plan on to the physical card. For example, the printing subsystem 220 may engrave a name, account number, and expiration date on to the physical card. In further aspects, the printing subsystem 220 may also apply a magnetic strip or embedded chip including information from the personalization onto the physical card.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A system comprising:
a processing device; and
a memory device that includes instructions that are executable by the processing device to cause the processing device to:
generate a graphical user interface configured to assist in a process for personalizing a physical card, wherein the process is formed from a plurality of steps including (a) receiving a selection of an image from a user, (b) approving the image for compliance with predefined image criteria, and (c) initiating manufacturing of the physical card with the image;
receive a code from the user via a first user device, wherein the code is a unique set of characters that was previously generated by the processing device and provided to the user to enable the user to access the graphical user interface without supplying a user-created password;
authenticate the first user device based on the code in response to receiving the code from the user;
receive the selection of the image from the user via a second user device that is different from the first user device;
based on the receiving the selection of the image from the user, transmit a notification to the second user device indicating that the user is required to select or create an account to continue the process;
subsequent to the user selecting or creating the account:
authenticate the user based on the code to continue the process;
determine a current step of the user in the process based on the code and a status identifier associated with the user in a database; and
update the graphical user interface to reflect the current step of the user in the process;
determine that the image is in an approval stage of the process in which the image is analyzed for compliance with the predefined image criteria;
update the status identifier to indicate that the image is in the approval stage; and
in response to determining that the image is approved in the approval stage, electronically transmit the image to a printing subsystem for generating a personalized card with the image for the user.

2. The system of claim 1, wherein the memory device further includes instructions that are executable by the processing device to cause the processing device to update the graphical user interface to include a message indicating the image is in the approval stage.

3. The system of claim 1, wherein the memory device further includes instructions that are executable by the processing device to cause the processing device to update the graphical user interface to include a message indicating the image has been rejected.

4. The system of claim 1, wherein the approval stage involves a manual inspection of the image by an agent, and wherein the memory device further includes instructions that are executable by the processing device to cause the processing device to:
   transmit a report to the agent to manually review the image;
   receive an approval or a rejection of the image from the agent; and
   update the status identifier based on the approval or the rejection.

5. The system of claim 1, wherein the printing subsystem is configured to, subsequent to the image being approved in the approval stage:
   obtain the image;
   receive, from a secure location in memory, account information corresponding to the account of the user; and
   apply the image and the account information to the physical card to generate the personalized card for use as a payment card.

6. The system of claim 1, wherein the approval stage involves analyzing the image for copyrighted material or subject matter that does not comply with one or more predefined lewdness standards.

7. The system of claim 1, wherein the memory device further includes instructions that are executable by the processing device to cause the processing device to store relationships between a user identifier for the user, a user code, the status identifier, and the image in one or more databases.

8. A method comprising:
   generating, by a processing device, a graphical user interface configured to assist in a process for personalizing a physical card, wherein the process is formed from a plurality of steps including (a) receiving a selection of an image from a user, (b) approving the image for compliance with predefined image criteria, and (c) initiating manufacturing of the physical card with the image;
   receiving, by the processing device, a code from the user via a first user device, wherein the code is a unique set of characters that was previously generated by the processing device and provided to the user to enable the user to access the graphical user interface without supplying a user-created password;
   authenticating, by the processing device, the first user device based on the code in response to receiving the code from the user;
   receiving, by the processing device, the selection of the image from the user via a second user device that is different from the first user device;
   based on the receiving the selection of the image from the user, transmitting, by the processing device, a notification to the second user device indicating that the user is required to select or create an account to continue the process;
   subsequent to the user selecting or creating the account:
   authenticating, by the processing device, the user based on the code to continue the process;
   determining, by the processing device, a current step of the user in the process based on the code and a status identifier associated with the user in a database; and
   updating, by the processing device, the graphical user interface to reflect the current step of the user in the process;
   determining, by the processing device, that the image is in an approval stage of the process in which the image is analyzed for compliance with the predefined image criteria;
   updating, by the processing device, the status identifier to indicate that the image is in the approval stage; and
   in response to determining that the image is approved in the approval stage, electronically transmitting, by the processing device, the image to a printing subsystem for generating a personalized card with the image for the user.

9. The method of claim 8, further comprising updating the graphical user interface to include a message indicating the image is in the approval stage.

10. The method of claim 8, further comprising updating the graphical user interface to include a message indicating the image has been rejected.

11. The method of claim 8, wherein the approval stage involves a manual inspection of the image by an agent, and further comprising:
   transmitting a report to the agent to manually review the image;
   receiving an approval or a rejection of the image from the agent; and
   updating the status identifier based on the approval or the rejection.

12. The method of claim 8, wherein the printing subsystem is configured to, subsequent to the image being approved in the approval stage:
   obtain the image;
   receive, from a secure location in memory, account information corresponding to the account of the user; and
   apply the image and the account information to the physical card to generate the personalized card for use as a payment card.

13. The method of claim 8, wherein the approval stage involves analyzing the image for copyrighted material or subject matter that does not comply with one or more predefined lewdness standards.

14. The method of claim 8, further comprising storing relationships between a user identifier for the user, a user code, the status identifier, and the image in one or more databases.

15. A non-transitory computer-readable medium comprising program code that is executable by a processing device to cause the processing device to:
   generate a graphical user interface configured to assist in a process for personalizing a physical card, wherein the process is formed from a plurality of steps including (a) receiving a selection of an image from a user, (b) approving the image for compliance with predefined image criteria, and (c) initiating manufacturing of the physical card with the image;
   receive a code from the user via a first user device, wherein the code is a unique set of characters that was previously generated by the processing device and provided to the user to enable the user to access the graphical user interface without supplying a user-created password;
   authenticate the first user device based on the code in response to receiving the code from the user;
   receive the selection of the image from the user via a second user device that is different from the first user device;

based on the receiving the selection of the image from the user, transmit a notification to the second user device indicating that the user is required to select or create an account to continue the process;

subsequent to the user selecting or creating the account:

authenticate the user based on the code to continue the process;

determine a current step of the user in the process based on the code and a status identifier associated with the user in a database; and update the graphical user interface to reflect the current step of the user in the process;

determine that the image is in an approval stage of the process in which the image is analyzed for compliance with the predefined image criteria;

update the status identifier to indicate that the image is in the approval stage; and in response to determining that the image is approved in the approval stage, electronically transmit the image to a printing subsystem for generating a personalized card with the image for the user.

16. The non-transitory computer-readable medium of claim 15, further comprising program code that is executable by the processing device to cause the processing device to update the graphical user interface to include a message indicating the image is in the approval stage.

17. The non-transitory computer-readable medium of claim 15, further comprising program code that is executable by the processing device to cause the processing device to update the graphical user interface to include a message indicating the image has been rejected.

18. The non-transitory computer-readable medium of claim 15, wherein the approval stage involves a manual inspection of the image by an agent, and further comprising program code that is executable by the processing device to cause the processing device to:

transmit a report to the agent to manually review the image;

receive an approval or a rejection of the image from the agent; and update the status identifier based on the approval or the rejection.

19. The non-transitory computer-readable medium of claim 15, wherein the approval stage involves analyzing the image for copyrighted material or subject matter that does not comply with one or more predefined lewdness standards.

20. The non-transitory computer-readable medium of claim 15, further comprising program code that is executable by the processing device to cause the processing device to store relationships between a user identifier for the user, a user code, the status identifier, and the image in one or more databases.

* * * * *